United States Patent
Liu et al.

(10) Patent No.: US 11,523,385 B2
(45) Date of Patent: Dec. 6, 2022

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 17/534,461

(22) Filed: Nov. 24, 2021

(65) Prior Publication Data
US 2022/0086815 A1 Mar. 17, 2022

Related U.S. Application Data

(63) Continuation of application No. 16/988,719, filed on Aug. 10, 2020, now Pat. No. 11,219,016, which is a (Continued)

(30) Foreign Application Priority Data

Feb. 13, 2018 (CN) .......................... 201810149428.0

(51) Int. Cl.
  *H04W 72/04* (2009.01)
  *H04L 27/26* (2006.01)
  *H04W 72/12* (2009.01)

(52) U.S. Cl.
  CPC ....... *H04W 72/044* (2013.01); *H04L 27/2601* (2013.01); *H04W 72/12* (2013.01)

(58) Field of Classification Search
  CPC ... H04W 72/044; H04W 72/12; H04W 72/04; H04W 24/08; H04W 48/12; H04L 27/2601; H04L 1/0041
  See application file for complete search history.

(56) References Cited

U.S. PATENT DOCUMENTS 11,201,656 B2 * 12/2021 Zhang .................. H04L 5/0082
2017/0251488 A1    8/2017 Urban
(Continued)

FOREIGN PATENT DOCUMENTS

CN    105721376 A    6/2016
CN    106162920 A    11/2016
(Continued)

OTHER PUBLICATIONS

ISR in application No. PCT/CN2019/074156 dated Apr. 18, 2019.
(Continued)

*Primary Examiner* — Khanh C Tran

(57) ABSTRACT

A method and a device in a communication node used for wireless communications is disclosed in the present disclosure. The communication node first receives first information and second information; and transmits a first radio signal in a first time window; and then transmits a second radio signal; the first information is used to determine a target time window, the second radio signal occupies a second time window in time domain, and the second information is used to determine at least one of whether the second time window belongs to the target time window or a relative position relationship between the second time window and the target time window; an end of the first time window is earlier than a start of the target time window. The present disclosure helps improve the utilization ratio of resources in Grant-Free transmission.

20 Claims, 13 Drawing Sheets

Related U.S. Application Data continuation of application No. PCT/CN2019/074156, filed on Jan. 31, 2019.

(56) References Cited

U.S. PATENT DOCUMENTS

| | | | | |
|---|---|---|---|---|
| 2017/0295561 A1* | 10/2017 | Kim | ...................... | H04B 7/0413 |
| 2019/0342033 A1* | 11/2019 | Lin | ....................... | H04L 1/1887 |
| 2022/0086918 A1* | 3/2022 | Liu | ....................... | H04W 24/08 |

FOREIGN PATENT DOCUMENTS

| | | | |
|---|---|---|---|
| CN | 106535353 | A | 3/2017 |
| CN | 107026724 | A | 8/2017 |
| CN | 107027179 | A | 8/2017 |
| CN | 107204837 | A | 9/2017 |
| WO | 2015149645 | A1 | 10/2015 |
| WO | 2016050196 | A2 | 4/2016 |
| WO | 2017190586 | A1 | 11/2017 |
| WO | 2018024206 | A1 | 2/2018 |

OTHER PUBLICATIONS

CN Search Report in application No. 201810149428.0 dated Feb. 25, 2020.

CN First Office Action in application No. 201810149428.0 dated Mar. 4, 2020.

CN Notice of Allowance in application No. 201810149428.0 dated May 18, 2020.

3rd Generation Partnership Project. "Technical Specification Group Radio Access Network; Study on New Radio (NR) Access Technology Physical Layer Aspects (Release 14)." 3GPP TR 38.802 V1.1.0 Jan. 31, 2017.

CN First Office Action in application No. 202010423210.7, dated Jul. 5, 2022.

CN First Search report in application No. 202010423210.7, dated Jun. 29, 2022.

* cited by examiner

METHOD AND DEVICE IN COMMUNICATION NODE USED FOR WIRELESS COMMUNICATION

CROSS REFERENCE TO RELATED APPLICATIONS

This application is a continuation of the U.S. patent application Ser. No. 16/988,719, filed on Aug. 10, 2020, which is a continuation of International Application No. PCT/CN2019/074156, filed Jan. 31, 2019, claims the priority benefit of Chinese Patent Application No. 201810149428.0, filed on Feb. 13, 2018, the full disclosure of which is incorporated herein by reference.

BACKGROUND

Technical Field

The present disclosure relates to transmission methods and devices in wireless communication systems, and in particular to a scheme and device of uplink Grant-free transmission.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72 plenary that a study on New Radio (NR), or what is called Fifth Generation (5G) shall be conducted. The work item of NR was approved at the 3GPP RAN #75 plenary to standardize NR.

To ensure better adaptability to various application scenarios and requirements, the 3GPP RAN #76 plenary also approved a study item of Non-orthogonal Multiple Access (NoMA) under NR, starting with R16 version, and started a WI to standardize relevant techniques afterwards. Among all kinds of NoMA transmission methods, Grant-Free uplink transmission will be a focus of the study because it's less demanding on the complexity of a receiver.

SUMMARY

In Grant-Free uplink transmissions, especially in the situation of Radio Resource Control (RRC) Inactive Mode, or RRC Idle Mode, uplink transmissions of different UEs are not synchronized. Due to unsynchronized transmissions in uplink, a new structure of uplink burst needs to be designed in Grant-Free uplink transmissions based on Preamble sequence to reduce collisions between a Grant-Free transmission and a Grant-based transmission, thus ensuring the success of transmission. The present disclosure proposes a solution. It should be noted that the embodiments of a base station in the present disclosure and characteristics in the embodiments may be applied to a User Equipment (UE) if there is no conflict, and vice versa. And the embodiments of the present disclosure and the characteristics in the embodiments may be mutually combined if no conflict is incurred.

The present disclosure provides a method in a first-type communication node for wireless communications, comprising:

receiving first information and second information;
transmitting a first radio signal in a first time window; and
transmitting a second radio signal;

herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the relationship between the second time window and the target time window is configured through the second information, including whether a length of the second time window is limited within the target time window, or where the second time window is located relative to the target time window if the length of the second time window does not belong to the target time window. The network side can control whether the data part in Grant-Free transmissions collides with previous and subsequent transmissions (which may be grant-based or grant-free), and, in the case of collision, the extent of the collisions, thereby enabling the network equipment to employ scheduling in avoidance of collision through detection of preamble sequence.

In one embodiment, scheduling is implemented to prevent collisions, thereby avoiding gap reserved in data transmission, saving overhead and enhancing the resource utilization ratio.

According to one aspect of the present disclosure, the above method is characterized in that the second time window belongs to the target time window, a time length of a time interval between an end of the second time window and an end of the target time window is no less than a difference between a time length of the first time window and a time length occupied by the first radio signal.

According to one aspect of the present disclosure, the above method is characterized in that the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

In one embodiment, if collision is allowed, whether the data configured in the second information collides with a previous transmission or a subsequent one matters, thus enabling the network side to control the collision in a flexible manner according to transmission requirements, for instance, if a previous transmission is uplink control, such as an SRS or a PUCCH, a possible collision controlled by the network side only occurs in the subsequent transmission; if a subsequent transmission is downlink control, such as a PDCCH, the collision controlled may only occur in the previous transmission. In this way scheduling is made full use of to avoid collision, thereby improving transmission efficiency.

According to one aspect of the present disclosure, the above method is characterized in further comprising:

receiving third information;

herein, the third information is used for indicating P candidate radio resources, and a radio resource occupied by the first radio signal is one of the P candidate radio resources, P being a positive integer, the third information is transmitted via the air interface.

According to one aspect of the present disclosure, the above method is characterized in that the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

The present disclosure provides a method in a second-type communication node for wireless communications, comprising:

transmitting first information and second information;

monitoring a first radio signal in a first time window; and receiving a second radio signal when the first radio signal is detected;

herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

According to one aspect of the present disclosure, the above method is characterized in that the second time window belongs to the target time window, a time length of a time interval between an end of the second time window and an end of the target time window is no less than a difference between a time length of the first time window and a time length occupied by the first radio signal.

According to one aspect of the present disclosure, the above method is characterized in that the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

According to one aspect of the present disclosure, the above method is characterized in further comprising:

transmitting third information;

herein, the third information is used for indicating P candidate radio resources, and a radio resource occupied by the first radio signal is one of the P candidate radio resources, P being a positive integer, the third information is transmitted via the air interface.

According to one aspect of the present disclosure, the above method is characterized in that the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

The present disclosure provides a first-type communication node for wireless communications, comprising:

a first receiver, receiving first information and second information;

a first transmitter, transmitting a first radio signal in a first time window; and a second transmitter, transmitting a second radio signal;

herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

According to one aspect of the present disclosure, the above first-type communication node is characterized in that the second time window belongs to the target time window, a time length of a time interval between an end of the second time window and an end of the target time window is no less than a difference between a time length of the first time window and a time length occupied by the first radio signal.

According to one aspect of the present disclosure, the above first-type communication node is characterized in that the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

According to one aspect of the present disclosure, the above first-type communication node is characterized in that the first receiver also receives third information; wherein the third information is used for indicating P candidate radio resources, and a radio resource occupied by the first radio signal is one of the P candidate radio resources, P being a positive integer, the third information is transmitted via the air interface.

According to one aspect of the present disclosure, the above first-type communication node is characterized in that the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

The present disclosure provides a second-type communication node for wireless communications, comprising:

a third transmitter, transmitting first information and second information;

a second receiver, monitoring a first radio signal in a first time window; and a third receiver, receiving a second radio signal when the first radio signal is detected;

herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

According to one aspect of the present disclosure, the above second-type communication node is characterized in that the second time window belongs to the target time window, a time length of a time interval between an end of the second time window and an end of the target time window is no less than a difference between a time length of the first time window and a time length occupied by the first radio signal.

According to one aspect of the present disclosure, the above second-type communication node is characterized in that the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

According to one aspect of the present disclosure, the above second-type communication node is characterized in that the third transmitter also transmits third information; wherein the third information is used for indicating P candidate radio resources, and a radio resource occupied by the first radio signal is one of the P candidate radio resources, P being a positive integer, the third information is transmitted via the air interface.

According to one aspect of the present disclosure, the above second-type communication node is characterized in that the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

In one embodiment, the present disclosure has the following technical advantages:

The present disclosure provides network equipment that can control, according to scheduling requests, whether to reserve gap to avoid collision for the data part in Grant-Free uplink transmission, thus striking a balance between scheduling flexibility and resource utilization, jointly contributing to higher transmission efficiency.

The method provided by the present disclosure allows the network side to control collision flexibly according to transmission requests (for example, if the previous transmission is uplink control, such as an SRS or a PUCCH, a possible collision controlled only occurs in a subsequent transmission, if a subsequent transmission is downlink, such as a PDCCH, a possible collision controlled only occurs in a previous transmission), thereby guaranteeing full use of scheduling in avoidance of collision, and enhancing transmission efficiency.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
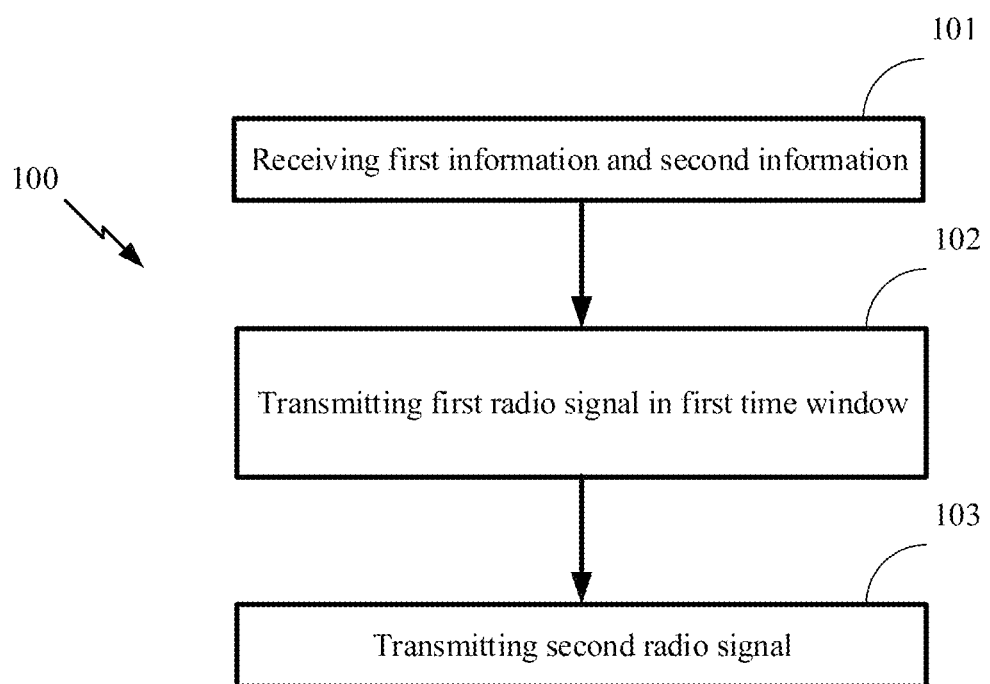
FIG. 1 illustrates a flowchart of transmission of first information, second information, a first radio signal and a second radio signal according to one embodiment of the present disclosure.

Embodiment 1 illustrates a flowchart of transmission of first information, second information, a first radio signal and a second radio signal according to one embodiment of the present disclosure, as shown in FIG. 1. In FIG. 1, each box represents a step. In Embodiment 1, the first-type communication node of the present disclosure first receives first information and second information; transmits a first radio signal in a first time window; and then transmits a second radio signal; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the first information is transmitted via a higher-layer signaling.

In one embodiment, the first information is transmitted via a physical-layer signaling.

In one embodiment, the first information comprises all or part of a higher-layer signaling.

In one embodiment, the first information comprises all or part of a physical-layer signaling.

In one embodiment, the first information is transmitted through a Physical Broadcast Channel (PBCH).

In one embodiment, the first information comprises one or more fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more fields in a System Information Block (SIB).

In one embodiment, the first information comprises one or more fields in Remaining System Information (RMSI).

In one embodiment, the first information comprises all or part of a Radio Resource Control (RRC) signaling.

In one embodiment, the first information is broadcast.

In one embodiment, the first information is unicast.

In one embodiment, the first information is cell-specific.

In one embodiment, the first information is UE-specific.

In one embodiment, the first information is transmitted through a Physical Downlink Control Channel (PDCCH).

In one embodiment, the first information comprises all or part of fields in a Downlink Control Information (DCI) signaling.

In one embodiment, the phrase that the first information is used for determining the target time window means that the first information is used by the first-type communication node for determining the target time window.

In one embodiment, the phrase that the first information is used for determining the target time window means that the first information directly indicates the target time window.

In one embodiment, the phrase that the first information is used for determining the target time window means that the first information indirectly indicates the target time window.

In one embodiment, the phrase that the first information is used for determining the target time window means that the first information explicitly indicates the target time window.

In one embodiment, the phrase that the first information is used for determining the target time window means that the first information implicitly indicates the target time window.

In one embodiment, the phrase that the first information is used for determining the target time window means that the first information is used for indicating at least one of a time length of a time interval between a start of the target time window and an end of the first time window, or a time length of the target time window.

In one embodiment, the phrase that the first information is used for determining the target time window means that the first information is used for indicating at least one of a time length of a time interval between a start of the target time window and a start of the first time window, or a time length of the target time window.

In one embodiment, the phrase that the first information is used for determining the target time window means that the first information is used for indicating at least one of a time length of the target time window or a time-domain position of the target time window.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information is transmitted through a PBCH.

In one embodiment, the second information comprises one or more fields in a MIB.

In one embodiment, the second information is transmitted through a DL-SCH.

In one embodiment, the second information is transmitted through a PDSCH.

In one embodiment, the second information comprises one or more fields in a SIB.

In one embodiment, the second information comprises one or more fields in RMSI.

In one embodiment, the second information comprises all or part of an RRC signaling.

In one embodiment, the second information is broadcast.

In one embodiment, the second information is unicast.

In one embodiment, the second information is cell-specific.

In one embodiment, the second information is UE-specific.

In one embodiment, the second information is transmitted through a PDCCH.

In one embodiment, the second information comprises all or part of fields in a DCI signaling.

In one embodiment, the phrase that the second information is used for determining at least one of whether the second time window belongs to the target time window or a relative position relationship between the second time window and the target time window means that the second information is used by the first-type communication node for determining at least one of whether the second time window belongs to the target time window or a relative position relationship between the second time window and the target time window.

In one embodiment, the phrase that the second information is used for determining at least one of whether the second time window belongs to the target time window or a relative position relationship between the second time window and the target time window means that the second information directly indicates at least one of whether the second time window belongs to the target time window or a relative position relationship between the second time window and the target time window.

In one embodiment, the phrase that the second information is used for determining at least one of whether the second time window belongs to the target time window or a relative position relationship between the second time window and the target time window means that the second information indirectly indicates at least one of whether the second time window belongs to the target time window or a relative position relationship between the second time window and the target time window.

In one embodiment, the phrase that the second information is used for determining at least one of whether the second time window belongs to the target time window or a relative position relationship between the second time window and the target time window means that the second information explicitly indicates at least one of whether the second time window belongs to the target time window or a relative position relationship between the second time window and the target time window.

In one embodiment, the phrase that the second information is used for determining at least one of whether the second time window belongs to the target time window or a relative position relationship between the second time window and the target time window means that the second information implicitly indicates at least one of whether the second time window belongs to the target time window or a relative position relationship between the second time window and the target time window.

In one embodiment, the first information and the second information are transmitted via a same signaling.

In one embodiment, the first information and the second information are transmitted via a same RRC signaling.

In one embodiment, the first information and the second information are transmitted via difference signalings.

In one embodiment, the first information and the second information are transmitted through a same physical channel.

In one embodiment, the first information and the second information are transmitted through different physical channels.

In one embodiment, the first information and the second information are transmitted through a same PDSCH.

In one embodiment, the first information and the second information are transmitted through two different PDSCHs.

In one embodiment, the first information and the second information are through Joint Coding and then transmitted via a same signaling.

In one embodiment, the first information and the second information are through Joint Coding and then transmitted as a same field in a same signaling.

In one embodiment, the first information and the second information are transmitted as two different fields in a same signaling.

In one embodiment, the first information and the second information are through Joint Coding and then transmitted as a same Information Element (IE) in a same RRC signaling.

In one embodiment, the first information and the second information are transmitted as two different IEs in a same RRC signaling.

In one embodiment, the first time window is a slot at a receiver side of the first radio signal with a given subcarrier spacing.

In one embodiment, the first time window is a positive integer number of consecutive slots at a receiver side of the first radio signal with a given subcarrier spacing.

In one embodiment, the first time window is a positive integer number of consecutive subframes at a receiver side of the first radio signal.

In one embodiment, a start and an end of the first time window are aligned with boundaries of multicarrier symbols respectively at a receiver side of the first radio signal.

In one embodiment, the first time window is a slot at the first-type communication node with a given subcarrier spacing.

In one embodiment, the first time window is a positive integer number of consecutive slots at the first-type communication node with a given subcarrier spacing.

In one embodiment, the first time window is a positive integer number of consecutive subframes at the first-type communication node.

In one embodiment, a start and an end of the first time window are aligned with boundaries of multicarrier symbols respectively at the first-type communication node.

In one embodiment, the first radio signal is generated by a characteristic sequence.

In one embodiment, the first radio signal is transmitted through a Physical Random Access Channel (PRACH).

In one embodiment, the first radio signal carries a Preamble.

In one embodiment, the first radio signal is transmitted through a Random Access Channel (RACH).

In one embodiment, the first radio signal is generated by a characteristic sequence, and the characteristic sequence is either a Zadoff-Chu (ZC) sequence or a pseudo-random sequence.

In one embodiment, the first radio signal is generated by a characteristic sequence, and the characteristic sequence is one of an integral number of orthogonal sequences or non-orthogonal sequences.

In one embodiment, a time length of the first time window is larger than a number of time-domain resources occupied by the first radio signal.

In one embodiment, a time length of the first time window is larger than a time length occupied by the first radio signal.

In one embodiment, the first-type communication node transmits the first radio signal in the first time window according to a downlink timing.

In one embodiment, the first-type communication node transmits the first radio signal in the first time window according to a time for reception of a boundary of a downlink slot serving as a start time for a transmission of the first radio signal.

In one embodiment, the second radio signal is transmitted through an Uplink Shared Channel (UL-SCH).

In one embodiment, the second radio signal is transmitted through a Physical Uplink Shared Channel (PUSCH).

In one embodiment, the second radio signal is obtained by all or part of bits in a Transport Block (TB) sequentially through TB Cyclic Redundancy Check (CRC) insertion, Code Block Segmentation, Code Block CRC insertion, Rate Matching, Concatenation, Scrambling, a Modulation Mapper, a Layer Mapper, Precoding, a Resource Element Mapper, and Baseband Signal Generation.

In one embodiment, the second radio signal is obtained by all or part of bits in a Transport Block (TB) sequentially through TB Cyclic Redundancy Check (CRC) insertion, Code Block Segmentation, Code Block CRC insertion, Rate Matching, Concatenation, Scrambling, a Modulation Mapper, a Layer Mapper, Transform Precoding, Precoding, a Resource Element Mapper, and Baseband Signal Generation.

In one embodiment, the second radio signal is obtained by all or part of bits in a positive integer number of Code Block(s) (CB) sequentially through CB CRC insertion, Rate Matching, Concatenation, Scrambling, a Modulation Mapper, a Layer Mapper, Transform Precoding, Precoding, a Resource Element Mapper, and Baseband Signal Generation.

In one embodiment, the second radio signal is obtained by all or part of bits in a positive integer number of Code Block(s) (CB) sequentially through Code Block CRC insertion, Rate Matching, Concatenation, Scrambling, a Modulation Mapper, a Layer Mapper, Precoding, a Resource Element Mapper, and Baseband Signal Generation.

In one embodiment, the relative position relationship between the second time window and the target time window comprises a time-domain relation between a start of the second time window and a start of the target time window.

In one embodiment, the relative position relationship between the second time window and the target time window comprises a time-domain relation between a start of the second time window and an end of the target time window.

In one embodiment, the relative position relationship between the second time window and the target time window comprises a time-domain relation between an end of the second time window and an end of the target time window.

In one embodiment, the relative position relationship between the second time window and the target time window comprises a time-domain relation between an end of the second time window and a start of the target time window.

In one embodiment, the second time window and the target time window are orthogonal.

In one embodiment, the second time window and the target time window are non-orthogonal.

In one embodiment, the second time window comprises a positive integer number of consecutive multicarrier symbol(s) (i.e., OFDM Symbols, including CP) at the first-type communication node with a given Subcarrier Spacing (SCS).

In one embodiment, the second time window comprises a positive integer number of consecutive multicarrier symbol(s) (i.e., OFDM Symbols, including CP) at a receiver side of the second radio signal with a given Subcarrier Spacing (SCS).

In one embodiment, the target time window is a slot at the first-type communication node with a given subcarrier spacing.

In one embodiment, the target time window is a positive integer number of consecutive multicarrier symbol(s) (i.e., OFDM symbols, including CP) at the first-type communication node with a given subcarrier spacing.

In one embodiment, the target time window is a positive integer number of consecutive slots at the first-type communication node with a given subcarrier spacing.

In one embodiment, the target time window is a positive integer number of consecutive subframes at the first-type communication node.

In one embodiment, the target time window is a slot at a receiver side of the second radio signal with a given subcarrier spacing.

In one embodiment, the target time window is a positive integer number of consecutive multicarrier symbol(s) (i.e., OFDM symbols, including CP) at a receiver side of the second radio signal with a given subcarrier spacing.

In one embodiment, the target time window is a positive integer number of consecutive slots at a receiver side of the second radio signal with a given subcarrier spacing.

In one embodiment, the target time window is a positive integer number of consecutive subframes at a receiver side of the second radio signal.

In one embodiment, a timing for the target time window is related to a timing for the first time window.

In one embodiment, a start of the target time window and an end of the target time window are aligned with boundaries of multicarrier symbols respectively at the first-type communication node.

In one embodiment, a start of the target time window and an end of the target time window are aligned with boundaries of multicarrier symbols respectively at a receiver of the second radio signal.

In one embodiment, the first time window, the second time window and the target time window are time windows at the first-type communication node.

In one embodiment, the first time window, the second time window and the target time window are time windows at a transmitter of the first information.

In one embodiment, a radio resource occupied by the first radio signal comprises at least one of a time-frequency resource or a code-domain resource.

In one embodiment, a radio resource occupied by the first radio signal comprises at least one of a time-domain resource occupied by the first radio signal, a frequency-domain resource occupied by the first radio signal or a code-domain resource occupied by the first radio signal.

In one embodiment, a radio resource occupied by the first radio signal comprises at least one of a characteristic sequence for generating the first radio signal or a time-frequency resource for transmitting the first radio signal.

In one embodiment, the code-domain resource occupied by the second radio signal refers to a characteristic sequence resource for generating the second radio signal.

In one embodiment, the code-domain resource occupied by the second radio signal refers to a scrambling sequence resource for generating the second radio signal.

In one embodiment, the code-domain resource occupied by the second radio signal refers to an interleaving sequence resource for generating the second radio signal.

In one embodiment, the code-domain resource occupied by the second radio signal refers to an orthogonal code resource for generating the second radio signal.

In one embodiment, the code-domain resource occupied by the second radio signal refers to a non-orthogonal code resource for generating the second radio signal.

In one embodiment, a time interval from the end of the first time window to the start of the target time window is no less than X millisecond(s), X being positive which is pre-defined or configurable.

In one embodiment, the air interface is wireless.

In one embodiment, the air interface comprises a wireless channel.

In one embodiment, the air interface is an interface between the second-type communication node and the first-type communication node.

In one embodiment, the air interface is a Uu interface.

Embodiment 2

Figure 2:
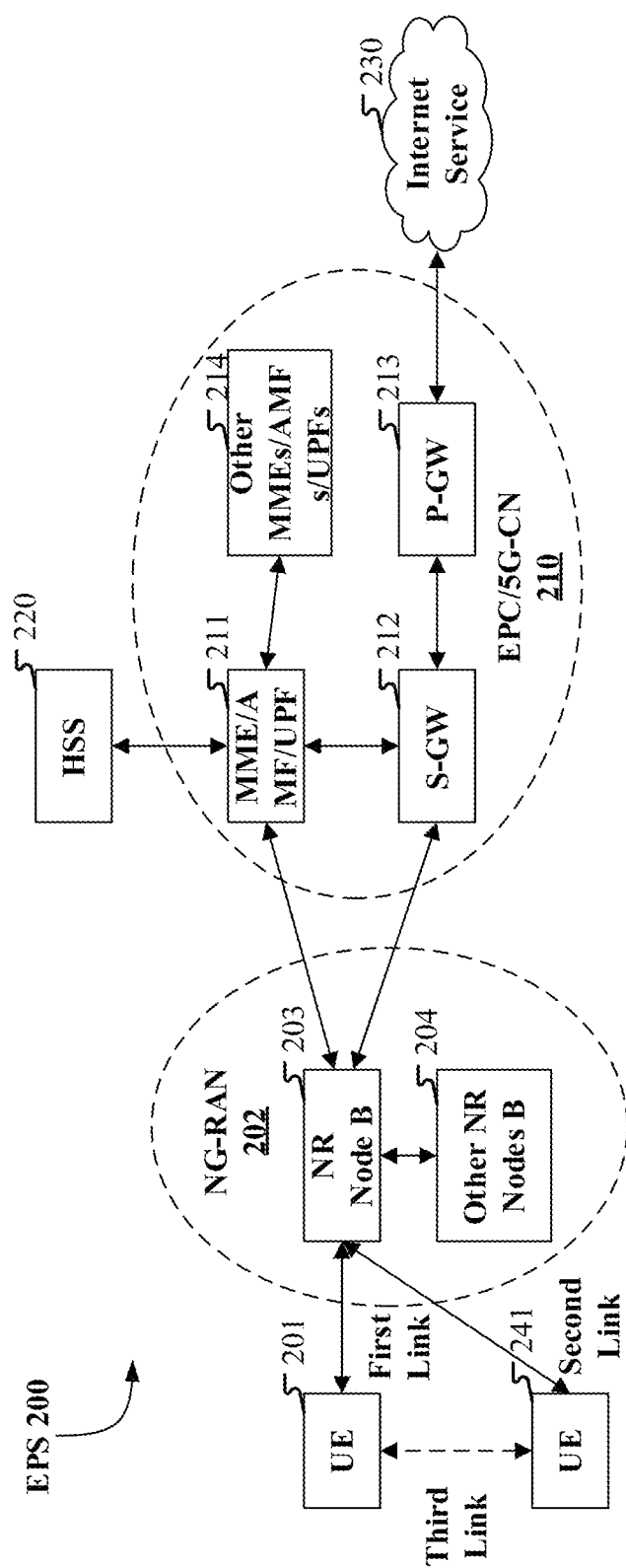
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200, which may comprise one or more UEs 201/241, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 may be a satellite, an aircraft or a terrestrial base station relayed by satellites. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first-type communication node in the present disclosure.

In one embodiment, the UE 201 supports Grant-Free uplink transmissions.

In one embodiment, the gNB 203 supports the second-type communication node in the present disclosure.

In one embodiment, the gNB 203 supports Grant-Free uplink transmissions.

Embodiment 3

Figure 3:
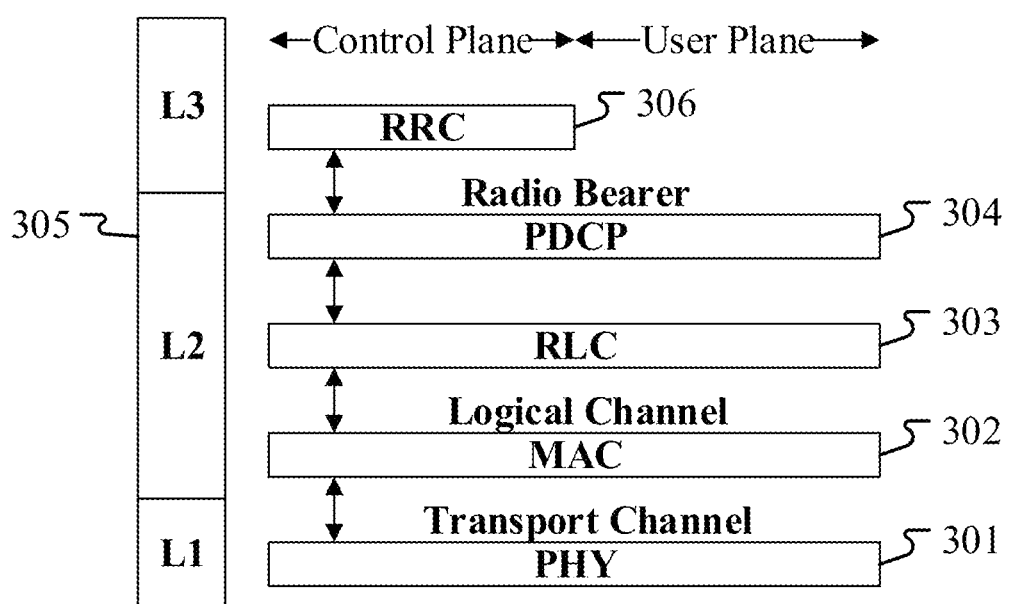
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating a radio protocol architecture of a user plane and a control plane. In FIG. 3, the radio protocol architecture for a first-type communication node (UE) and a second-type communication node (gNB, eNB, or, a satellite or aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication nodes of the network side. Although not described in FIG. 3, the first-type communication node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels.

The PDCP sublayer 304 also provides a header compression for a higher-layer packet so as to reduce radio transmission overhead. The PDCP sublayer 304 provides security by encrypting a packet and provides support for handover of first-type communication node between second-type communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first-type communication nodes various radio resources (i.e., resource blocks) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information of the present disclosure is generated by the RRC sublayer 306.

In one embodiment, the second information of the present disclosure is generated by the RRC sublayer 306.

In one embodiment, the first information of the present disclosure is generated by the MAC sublayer 302.

In one embodiment, the second information of the present disclosure is generated by the MAC sublayer 302.

In one embodiment, the first information of the present disclosure is generated by the PHY 301.

In one embodiment, the second information of the present disclosure is generated by the PHY 301.

In one embodiment, the first radio signal of the present disclosure is generated by the RRC sublayer 306.

In one embodiment, the first radio signal of the present disclosure is generated by the MAC sublayer 302.

In one embodiment, the first radio signal of the present disclosure is generated by the PHY 301.

In one embodiment, the second radio signal of the present disclosure is generated by the RRC sublayer 306.

In one embodiment, the second radio signal of the present disclosure is generated by the MAC sublayer 302.

In one embodiment, the second radio signal of the present disclosure is generated by the PHY 301.

Embodiment 4

Figure 4:
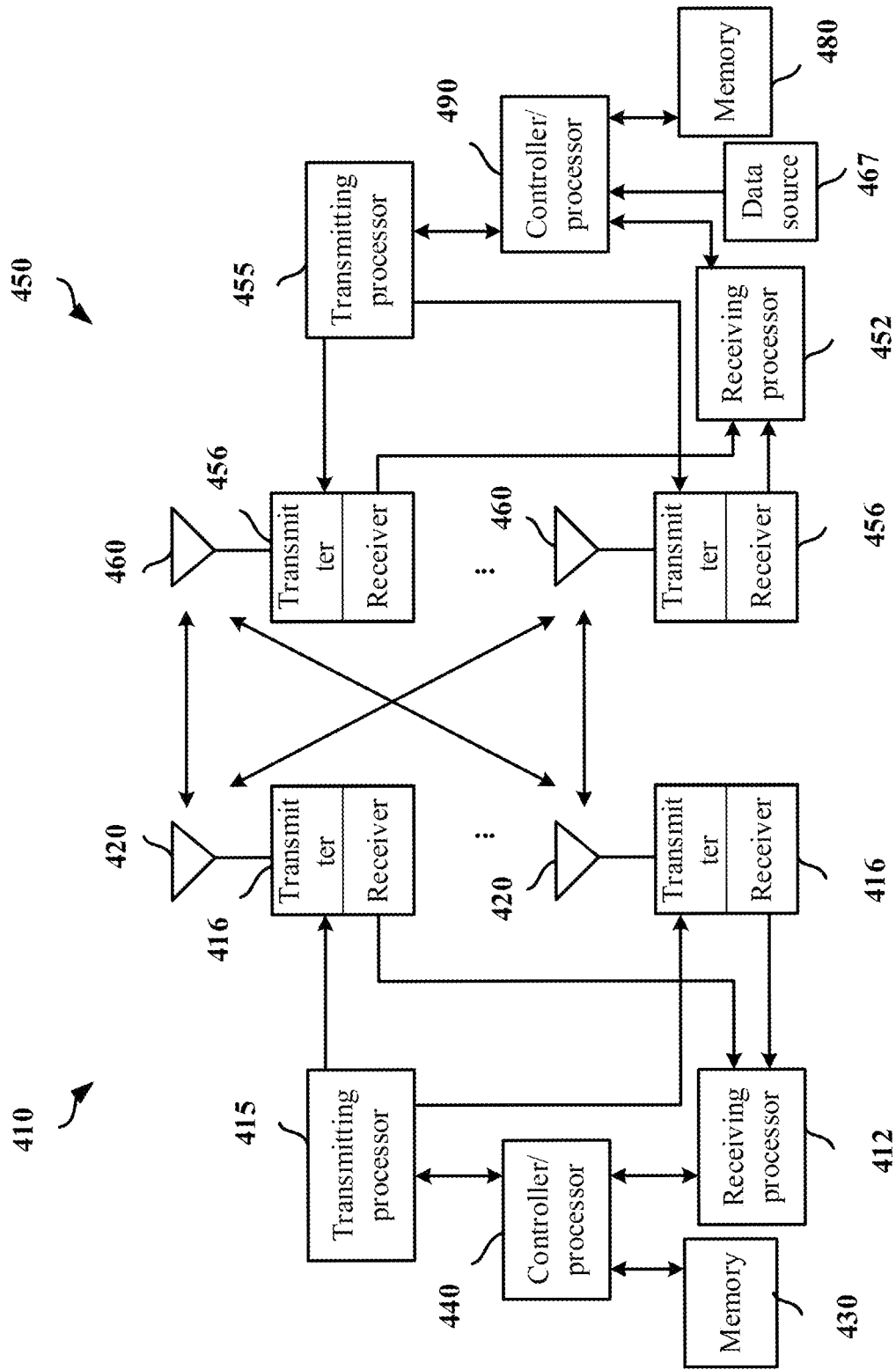
FIG. 4 illustrates a schematic diagram of a first-type communication node and a second-type communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering as well as multiplexing and demultiplexing between a logical channel and a transport channel so as to implement the L2 layer protocols used for the user plane and the control plane. The higher layer packet may comprise data or control information, such as DL-SCH or UL-SCH. The transmitting processor 455 performs various signal transmitting processing functions of the L1 layer (that is, PHY), including coding, interleaving, scrambling, modulation, power control/allocation, precoding and physical layer signaling generation. The receiving processor 452 performs various signal receiving processing functions of the L1 layer (that is, PHY), including decoding, de-interleaving, descrambling, demodulation, de-precoding and physical layer control signaling extraction. The transmitter 456 is configured to convert a baseband signal provided by the transmitting processor 455 into a radio frequency (RF) signal to be transmitted via the antenna 460. The receiver 456 is configured to convert the RF signal received via the antenna 460 into a baseband signal to be provided to the receiving processor 452.

The base station (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440. The controller/processor 440 provides header compression and decompression, encryption and decryption, packet segmentation and reordering as well as multiplexing and demultiplexing between a logical channel and a transport channel, so as to implement the L2 layer protocols used for the user plane and the control plane. The higher layer packet may comprise data or control information, such as DL-SCH or UL-SCH. The transmitting processor 415 performs various signal transmitting processing functions of the L1 layer (that is, PHY), including coding, interleaving, scrambling, modulation, power control/allocation, precoding and physical layer signaling (i.e., synchronization signal, reference signal, etc.) generation. The receiving processor 412 performs various signal receiving processing functions of the L1 layer (that is, PHY), including decoding, de-interleaving, descrambling, demodulation, de-precoding and physical layer signaling extraction. The transmitter 416 is configured to convert a baseband signal provided by the transmitting processor 415 into a RF signal to be transmitted via the antenna 420. The receiver 416 is configured to convert the RF signal received via the antenna 420 into a baseband signal to be provided to the receiving processor 412.

In Downlink (DL) transmission, a higher layer packet, as carried by first information, second information, and third information of the present disclosure, is provided to the controller/processor 440. The controller/processor 440 implements the functionality of the L2 layer. In DL transmission, the controller/processor 440 provides header compression, encryption, packet segmentation and reordering and multiplexing between a logical channel and a transport channel, as well as radio resource allocation for the UE 450 based on varied priorities. The controller/processor 440 is also in charge of HARQ operation, retransmission of a lost packet, and a signaling to the UE 450, for instance, the first information, the second information, and the third information of the present disclosure are all generated in the controller/processor 440. The transmitting processor 415 performs signal processing functions of the L1 layer (that is, PHY), including decoding and interleaving, so as to promote Forward Error Correction (FEC) at the UE 450 side and modulation of baseband signal based on various modulation schemes (i.e., BPSK, QPSK). Modulation symbols are divided into parallel streams and each stream is mapped onto a corresponding multicarrier subcarrier and/or multicarrier symbol, which is later mapped from the transmitting processor 415 to the antenna 420 via the transmitter 416 to be transmitted in the form of RF signal. Corresponding channels of the first information, the second information and the third information of the present disclosure on physical layer are mapped from the transmitting processor 415 to a target radio resource and then mapped from the transmitter 416 to the antenna 420 to be transmitted in the form of RF signals. At the receiver side, each receiver 456 receives an RF signal via a corresponding antenna 460; each receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first information, the second information and the third information of the present disclosure, demodulation of multicarrier symbols in multicarrier symbol streams based on each modulation scheme (e.g., BPSK, QPSK), and then decoding and de-interleaving of the demodulated symbols so as to recover data or control signals transmitted by the base station (gNB) 410 on a physical channel, and the data or control signals are later provided to the controller/processor 490. The controller/processor 490 implements the functionality of the L2 layer, and interprets the first information, the second information, and the third information of the present disclosure. The controller/processor 490 may be associated with the memory 480 that stores program codes and data. The memory 480 can be called a computer readable medium.

In Uplink (UL) transmission, the data source 467 is used to provide configuration data relevant to the first radio signal of the present disclosure to the controller/processor 490. The data source 467 represents all protocol layers above the L2 layer, and the second radio signal is generated by the data source 467. The controller/processor 490 provides header compression, encryption, packet segmentation and reordering and multiplexing between a logical channel and a transport channel based on radio resources allocation for the gNB 410, so as to implement the L2 layer protocols used for the user plane and the control plane. The controller/processor 490 is also in charge of HARQ operation, retransmission of a lost packet, and a signaling to the gNB 410. The transmitting processor 455 provides various signal transmitting processing functions used for the L1 layer (that is, PHY). The signal transmitting processing functions include coding and modulating, etc. Modulation symbols are divided into parallel streams and each stream is mapped onto a corresponding multicarrier subcarrier and/or multicarrier symbol for baseband signal generation, which is later mapped from the transmitting processor 455 to the antenna 460 via the transmitter 456 to be transmitted in the form of RF signal. Signals on physical layer (including generation and transmission of the first radio signal of the present disclosure, and processing of the second radio signal on physical layer) are generated by the transmitting processor 455. The receiver 416 receives an RF signal via a corresponding antenna 420. Each receiver 416 recovers baseband information modulated to the RF carrier, and provides the baseband information to the receiving processor 412. The receiving processor 412 provides various signal receiving processing functions used for the L1 layer (that is, PHY), including detecting of the first radio signal of the present disclosure and receiving of the second radio signal on physical layer. The signal receiving processing functions also include acquisition of multicarrier symbol streams, demodulation of multicarrier symbols in the multicarrier symbol streams based on each modulation scheme, and then decoding of the demodulated symbols so as to recover data and/or control signals originally transmitted by the UE 450 on a physical channel. And the data and/or control signals are later provided to the controller/processor 440. The controller/processor 440 implements the functionality of the L2 layer. The controller/processor 440 may be associated with the memory 430 that stores program codes and data. The memory 430 can be called a computer readable medium.

In one embodiment, the UE 450 corresponds to the first-type communication node of the present disclosure.

In one embodiment, the gNB 410 corresponds to the second-type communication node of the present disclosure.

In one embodiment, the UE 450 comprises at least one processor and at least one memory, the at least one memory comprises computer program codes; the at least one memory and the computer program codes are configured to be used in collaboration with the at least one processor, the UE 450 at least receives first information and second information; transmits a first radio signal in a first time window; and then transmits a second radio signal; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the UE 450 comprises a memory that stores computer readable instruction program, the computer readable instruction program generates actions when executed by at least one processor, which include: receiving first information and second information; transmitting a first radio signal in a first time window; and then transmitting a second radio signal; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the gNB 410 comprises at least one processor and at least one memory, the at least one memory comprises computer program codes; the at least one memory and the computer program codes are configured to be used in collaboration with the at least one processor. The gNB 410 at least transmits first information and second information; monitors a first radio signal in a first time window; and receives a second radio signal when the first radio signal is detected; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the gNB 410 comprises a memory that stores computer readable instruction program, the computer readable instruction program generates actions when executed by at least one processor, which include: transmitting first information and second information; monitoring a first radio signal in a first time window; and receiving a second radio signal when the first radio signal is detected; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the receiver 456 (comprising the antenna 460), the receiving processor 452 and the controller/processor 490 are used in the present disclosure for receiving the first information.

In one embodiment, the receiver 456 (comprising the antenna 460), the receiving processor 452 and the controller/processor 490 are used in the present disclosure for receiving the second information.

In one embodiment, the receiver 456 (comprising the antenna 460), the receiving processor 452 and the controller/processor 490 are used in the present disclosure for receiving the third information.

In one embodiment, the transmitter 456 (comprising the antenna 460), the transmitting processor 455 and the controller/processor 490 are used in the present disclosure for transmitting the first radio signal.

In one embodiment, the transmitter 456 (comprising the antenna 460), the transmitting processor 455 and the controller/processor 490 are used in the present disclosure for transmitting the second radio signal.

In one embodiment, the transmitter 416 (comprising the antenna 420), the transmitting processor 415 and the controller/processor 440 are used for transmitting the first information of the present disclosure.

In one embodiment, the transmitter 416 (comprising the antenna 420), the transmitting processor 415 and the controller/processor 440 are used for transmitting the second information of the present disclosure.

In one embodiment, the transmitter 416 (comprising the antenna 420), the transmitting processor 415 and the controller/processor 440 are used for transmitting the third information of the present disclosure.

In one embodiment, the receiver 416 (comprising the antenna 420), the receiving processor 412 and the controller/processor 440 are used for receiving the first radio signal of the present disclosure.

In one embodiment, the receiver 416 (comprising the antenna 420), the receiving processor 412 and the controller/processor 440 are used for receiving the second radio signal of the present disclosure.

Embodiment 5

Figure 5:
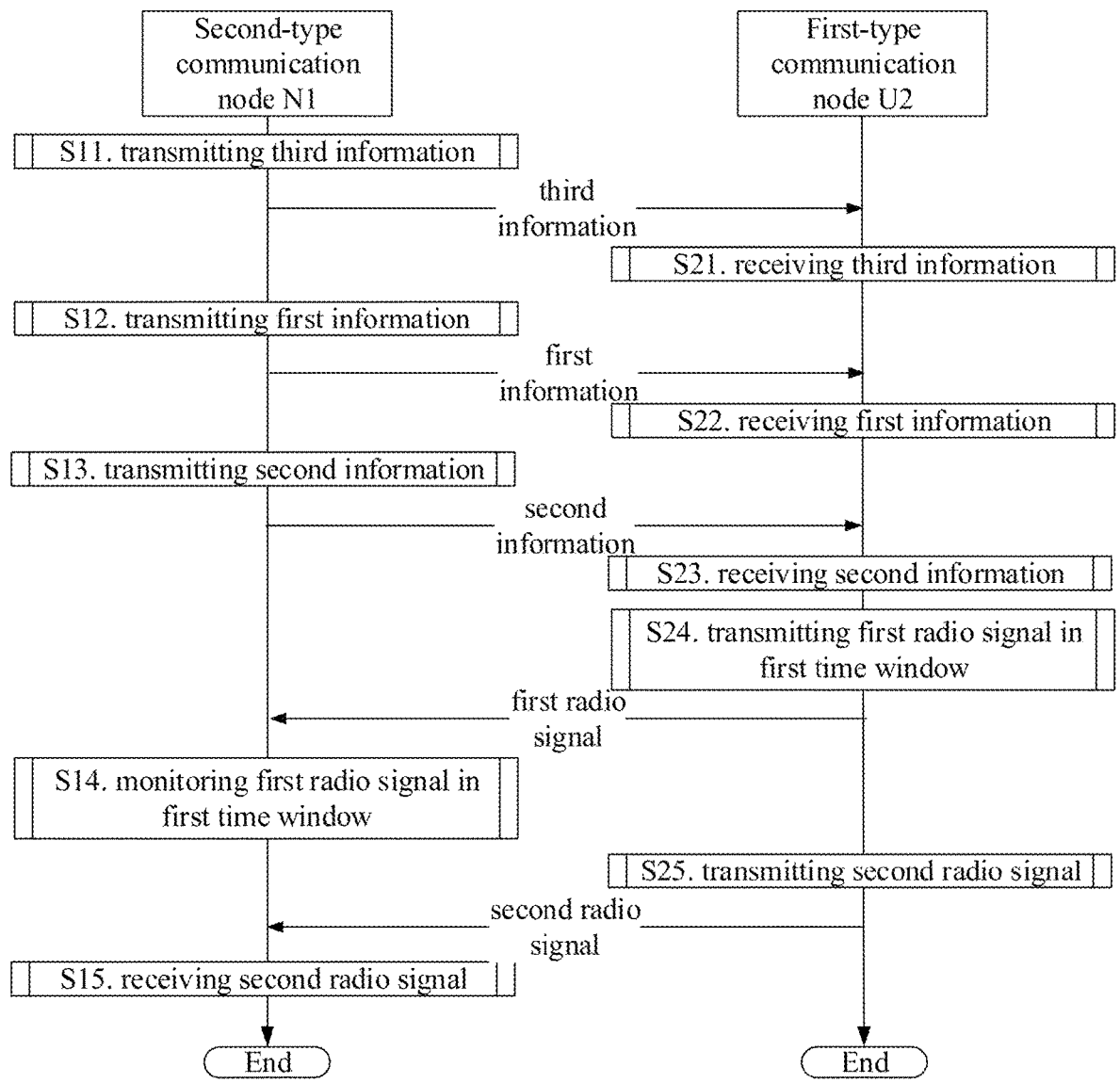
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second-type communication node N1 is a maintenance base station for a serving cell of a first-type communication node U2.

The second-type communication node N1 transmits third information in step S11, transmits first information in step S12, transmits second information in step S13, monitors a first radio signal in a first time window in step S14, and receives a second radio signal in step S15.

The first-type communication node U2 receives third information in step S21, receives first information in step S22, receives second information in step S23, transmits a first radio signal in a first time window in step S24, and transmits a second radio signal in step S25.

In Embodiment 5, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface; the third information is used for indicating P candidate radio resources, and a radio resource occupied by the first radio signal is one of the P candidate radio resources, P being a positive integer, the third information is transmitted via the air interface.

In one embodiment, the third information is transmitted via a higher-layer signaling.

In one embodiment, the third information is transmitted via a physical layer signaling.

In one embodiment, the third information comprises all or part of a higher-layer signaling.

In one embodiment, the third information comprises all or part of a physical layer signaling.

In one embodiment, the third information is transmitted through a PBCH.

In one embodiment, the third information comprises one or more fields in a MIB.

In one embodiment, the third information is transmitted through a DL-SCH.

In one embodiment, the third information is transmitted through a PDSCH.

In one embodiment, the third information comprises one or more fields in a SIB.

In one embodiment, the third information comprises one or more fields in RMSI.

In one embodiment, the third information comprises all or part of an RRC signaling.

In one embodiment, the third information is broadcast.

In one embodiment, the third information is unicast.

In one embodiment, the third information is cell-specific.

In one embodiment, the third information is UE-specific.

In one embodiment, the third information is transmitted through a PDCCH.

In one embodiment, the third information comprises all or part of fields in a DCI signaling.

In one embodiment, the first information and the third information are transmitted via a same signaling.

In one embodiment, the first information and the third information are transmitted via a same RRC signaling.

In one embodiment, the first information and the third information are transmitted via different signalings.

In one embodiment, the first information and the third information are transmitted through a same physical channel.

In one embodiment, the first information and the third information are transmitted through different physical channels.

In one embodiment, the first information and the third information are transmitted through a same PDSCH.

In one embodiment, the first information and the third information are transmitted through two different PDSCHs.

In one embodiment, the first information and the third information are transmitted as two different fields in a same signaling.

In one embodiment, the first information and the third information are transmitted as two different IEs in a same RRC signaling.

In one embodiment, the phrase that the third information is used for indicating the P candidate radio resources means that the third information is used for directly indicating the P candidate radio resources.

In one embodiment, the phrase that the third information is used for indicating the P candidate radio resources means that the third information is used for indirectly indicating the P candidate radio resources.

In one embodiment, the phrase that the third information is used for indicating the P candidate radio resources means that the third information is used for implicitly indicating the P candidate radio resources.

In one embodiment, the phrase that the third information is used for indicating the P candidate radio resources means that the third information is used for explicitly indicating the P candidate radio resources.

Embodiment 6

Figure 6:
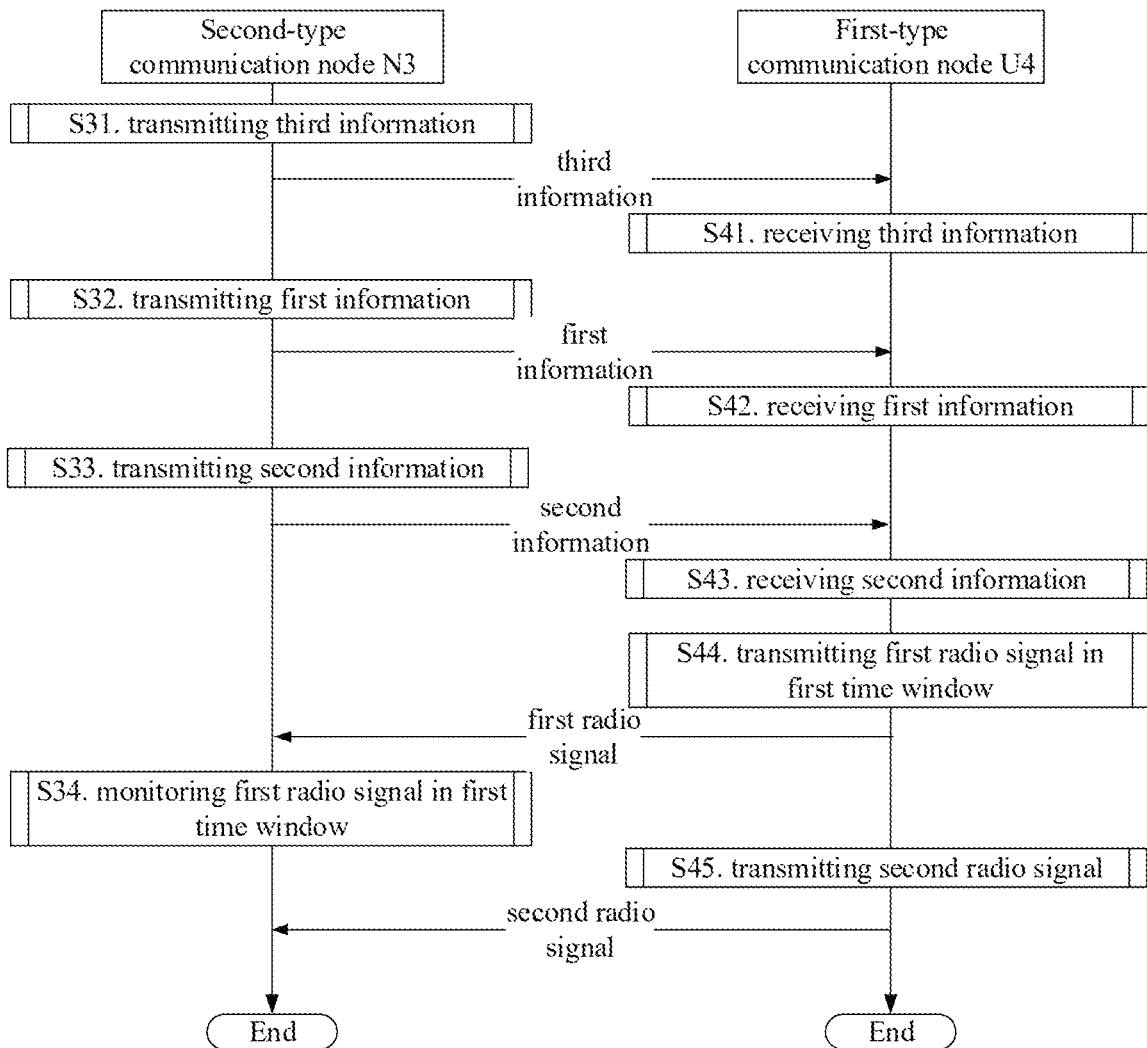
FIG. 6 illustrates another flowchart of radio signal transmission according to one embodiment of the present disclosure.

Embodiment 6 illustrates another flowchart of radio signal transmission according to one embodiment of the present disclosure, as shown in FIG. 6. In FIG. 6, a second-type communication node N3 is a maintenance base station for a serving cell of a first-type communication node U4.

The second-type communication node N3 transmits third information in step S31, transmits first information in step S32, transmits second information in step S33, and monitors a first radio signal in a first time window in step S34.

The first-type communication node U4 receives third information in step S41, receives first information in step S42, receives second information in step S43, transmits a first radio signal in a first time window in step S44, and transmits a second radio signal in step S45.

In Embodiment 6, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are transmitted via an air interface; the third information is used for indicating P candidate radio resources, and a radio resource occupied by the first radio signal is one of the P candidate radio resources, P being a positive integer, the third information is transmitted via the air interface.

Embodiment 7

Figure 7:
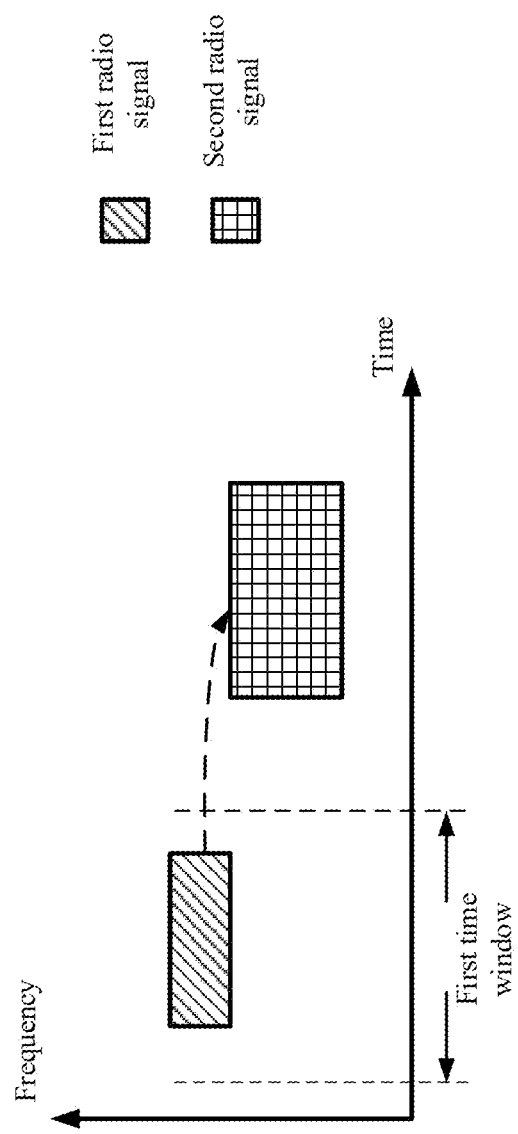
FIG. 7 illustrates a schematic diagram of relationship between a first radio signal and a second radio signal according to one embodiment of the present disclosure.

Embodiment 7 illustrates a schematic diagram of relationship between a first radio signal and a second radio signal according to one embodiment of the present disclosure, as shown in FIG. 7. In FIG. 7, the horizontal axis represents time, while the vertical axis represents frequency. The slash-filled rectangle represents a first radio signal, and the grid-filled rectangle represents a second radio signal.

In Embodiment 7, a radio resource occupied by the first radio signal in the present disclosure is used for determining at least one of a frequency-domain resource occupied by the second radio signal, a code-domain resource occupied by the second radio signal or a Modulation and Coding Scheme employed by the second radio signal.

In one embodiment, the first radio signal is generated by a characteristic sequence.

In one embodiment, the first radio signal is transmitted through a PRACH.

In one embodiment, the first radio signal carries a Preamble.

In one embodiment, the first radio signal is transmitted through a RACH.

In one embodiment, the first radio signal is generated by a characteristic sequence, and the characteristic sequence is either a Zadoff-Chu (ZC) sequence or a pseudo-random sequence.

In one embodiment, the first radio signal is generated by a characteristic sequence, and the characteristic sequence is one of an integral number of orthogonal sequences or non-orthogonal sequences.

In one embodiment, the second radio signal is transmitted through a UL-SCH.

In one embodiment, the second radio signal is transmitted through a PUSCH.

In one embodiment, the second radio signal is obtained by all or part of bits in a Transport Block (TB) sequentially through TB Cyclic Redundancy Check (CRC) insertion, Code Block Segmentation, Code Block CRC insertion, Rate Matching, Concatenation, Scrambling, a Modulation Mapper, a Layer Mapper, Precoding, a Resource Element Mapper, and Baseband Signal Generation.

In one embodiment, the second radio signal is obtained by all or part of bits in a Transport Block (TB) sequentially through TB Cyclic Redundancy Check (CRC) insertion, Code Block Segmentation, Code Block CRC insertion, Rate Matching, Concatenation, Scrambling, a Modulation Mapper, a Layer Mapper, Transform Precoding, Precoding, a Resource Element Mapper, and Baseband Signal Generation.

In one embodiment, the second radio signal is obtained by all or part of bits in a positive integer number of Code Block(s) (CB) sequentially through CB CRC insertion, Rate Matching, Concatenation, Scrambling, a Modulation Mapper, a Layer Mapper, Transform Precoding, Precoding, a Resource Element Mapper, and Baseband Signal Generation.

In one embodiment, the second radio signal is obtained by all or part of bits in a positive integer number of Code Block(s) (CB) sequentially through Code Block CRC insertion, Rate Matching, Concatenation, Scrambling, a Modulation Mapper, a Layer Mapper, Precoding, a Resource Element Mapper, and Baseband Signal Generation.

In one embodiment, a radio resource occupied by the first radio signal comprises at least one of a time-frequency resource or a code-domain resource.

In one embodiment, a radio resource occupied by the first radio signal comprises at least one of a time-domain resource occupied by the first radio signal, a frequency-domain resource occupied by the first radio signal or a code-domain resource occupied by the first radio signal.

In one embodiment, a radio resource occupied by the first radio signal comprises at least one of a characteristic sequence for generating the first radio signal or a time-frequency resource for transmitting the first radio signal.

In one embodiment, the code-domain resource occupied by the second radio signal refers to a characteristic sequence resource for generating the second radio signal.

In one embodiment, the code-domain resource occupied by the second radio signal refers to a scrambling sequence resource for generating the second radio signal.

In one embodiment, the code-domain resource occupied by the second radio signal refers to an interleaving sequence resource for generating the second radio signal.

In one embodiment, the code-domain resource occupied by the second radio signal refers to an orthogonal code resource for generating the second radio signal.

In one embodiment, the code-domain resource occupied by the second radio signal refers to a non-orthogonal code resource for generating the second radio signal.

Embodiment 8

Figure 8:
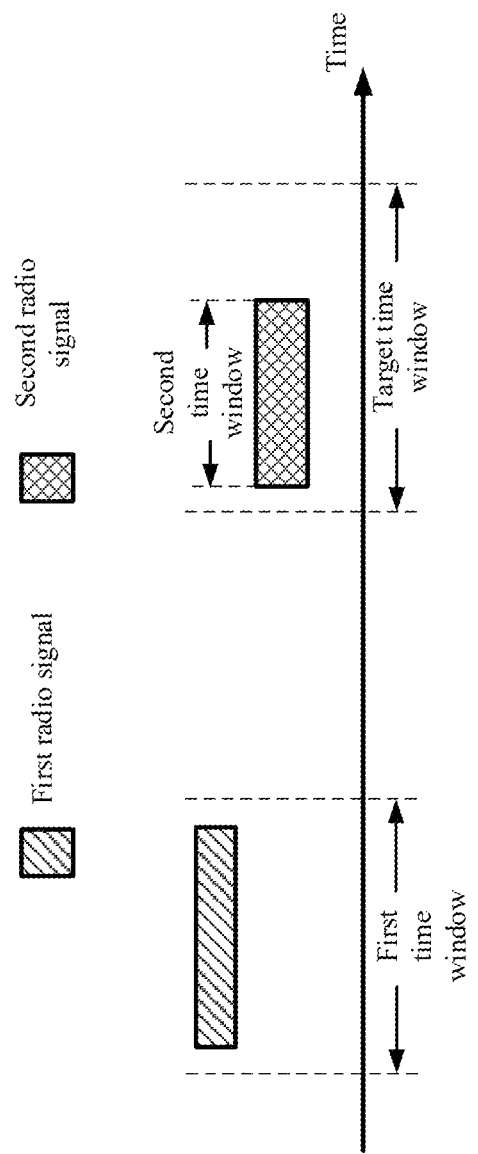
FIG. 8 illustrates a schematic diagram of relationship between a second time window and a target time window according to one embodiment of the present disclosure.

Embodiment 8 illustrates a schematic diagram of relationship between a second time window and a target time window according to one embodiment of the present disclosure, as shown in FIG. 8. In FIG. 8, the horizontal axis represents time; the slash-filled rectangle represents a first radio signal, and the cross-filled rectangle represents a second radio signal.

In Embodiment 8, the second time window in the present disclosure belongs to the target time window in the present disclosure, a time length of a time interval between an end of the second time window and an end of the target time window is no less than a difference between a time length of the first time window and a time length occupied by the first radio signal.

In one embodiment, a time length of a time interval between an end of the second time window and an end of the target time window is equal to a difference between a time length of the first time window and a time length occupied by the first radio signal.

In one embodiment, a time length of a time interval between an end of the second time window and an end of the target time window is less than a difference between a time length of the first time window and a time length occupied by the first radio signal.

In one embodiment, a time length occupied by the first radio signal comprises a time length of symbols and a time length of Cyclic Prefix (CP).

In one embodiment, the target time window comprises all time-domain resources in the second time window.

In one embodiment, a difference between a time length of the first time window and a time length occupied by the first radio signal is a time length of a gap under a given format of a Physical Random Access Channel (PRACH).

In one embodiment, a difference between a time length of the first time window and a time length occupied by the first radio signal is equal to one of 2975 Ts, 21904 Ts, 2976 Ts, 1096 Ts, 2916 Ts, 96 Ts, 216 Ts, 360 Ts and 792 Ts, where Ts=1/30.72 MHz.

In one embodiment, a time length of a time interval between an end of the second time window and an end of the target time window is equal to a time length of a positive integer number of multicarrier symbol(s) (including CP) with a given subcarrier spacing.

Embodiment 9

Figure 9:
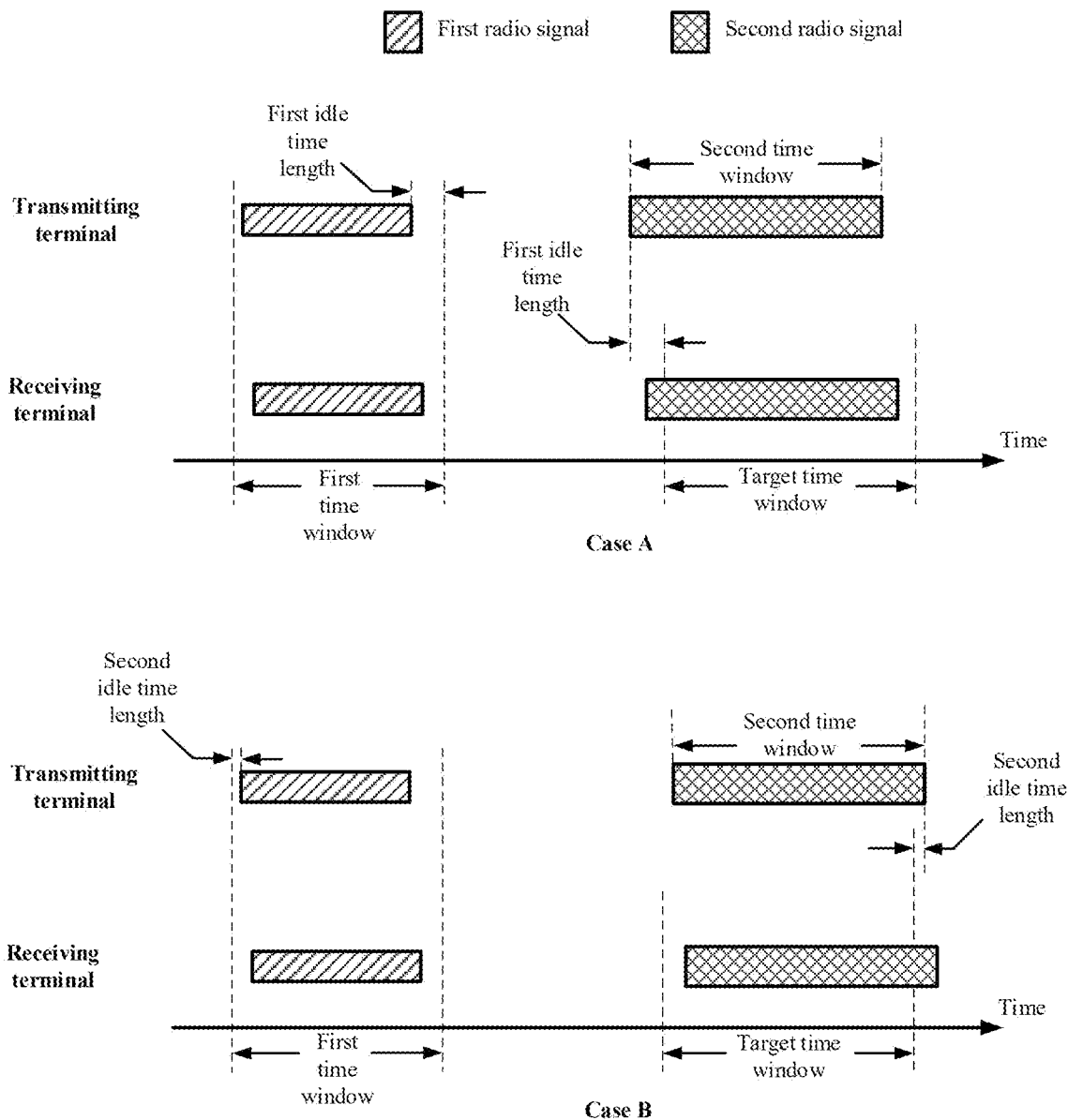
FIG. 9 illustrates a schematic diagram of a first gap length and a second gap length according to one embodiment of the present disclosure.

Embodiment 9 illustrates a schematic diagram of a first gap length and a second gap length according to one embodiment of the present disclosure, as shown in FIG. 9. In FIG. 9, the horizontal axis represents time; the slash-filled rectangle represents a first radio signal, and a cross-filled rectangle represents a second radio signal. In Case A and Case B, the upper section represents a transmitting terminal, while the lower section represents a receiving terminal.

In Embodiment 9, the second time window in the present disclosure comprises a time-domain resource other than the target time window of the present disclosure; a time length of a time interval between an end time for a transmission of the first radio signal in the present disclosure and an end of the first time window in the present disclosure is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

In one embodiment, the first gap length is dependent on a distance from the first-type communication node to a receiver of the first radio signal.

In one embodiment, the first gap length is equal to a time length of a positive integer number of multicarrier symbol(s) (including CP).

In one embodiment, the first gap length is equal to a time length of a fractional number of multicarrier symbol (including CP).

In one embodiment, the first gap length is equal to a time length of a positive integer number of sampling spacings employed by an implementation of the first-type communication node.

In one embodiment, the first gap length is equal to a transmission delay of the first radio signal subtracted from a time length of a gap under a given format of a PRACH.

In one embodiment, the first gap length is equal to one of 2975 Ts, 21904 Ts, 2976 Ts, 1096 Ts, 2916 Ts, 96 Ts, 216 Ts, 360 Ts and 792 Ts by subtracting a transmission delay of the first radio signal, where Ts=1/30.72 MHz.

In one embodiment, the second gap length is dependent on a distance from the first-type communication node to a receiver of the first radio signal.

In one embodiment, the second gap length is equal to a time length of a positive integer number of multicarrier symbol(s) (including CP).

In one embodiment, the second gap length is equal to a time length of a non-positive integer number of multicarrier symbol (including CP).

In one embodiment, the second gap length is equal to a time length of a positive integer number of sampling spacings employed by an implementation of the first-type communication node.

In one embodiment, the second gap length is equal to a transmission delay of the first radio signal.

In one embodiment, a time length of the second time window is equal to a time length of the target time window.

In one embodiment, a time length of the second time window is unequal to a time length of the target time window.

In one embodiment, a start of the second time window is earlier than a start of the target time window.

In one embodiment, a start of the second time window is later than a start of the target time window.

In one embodiment, an end of the target time window is earlier than an end of the second time window.

In one embodiment, an end of the target time window is later than an end of the second time window.

Embodiment 10

Figure 10:
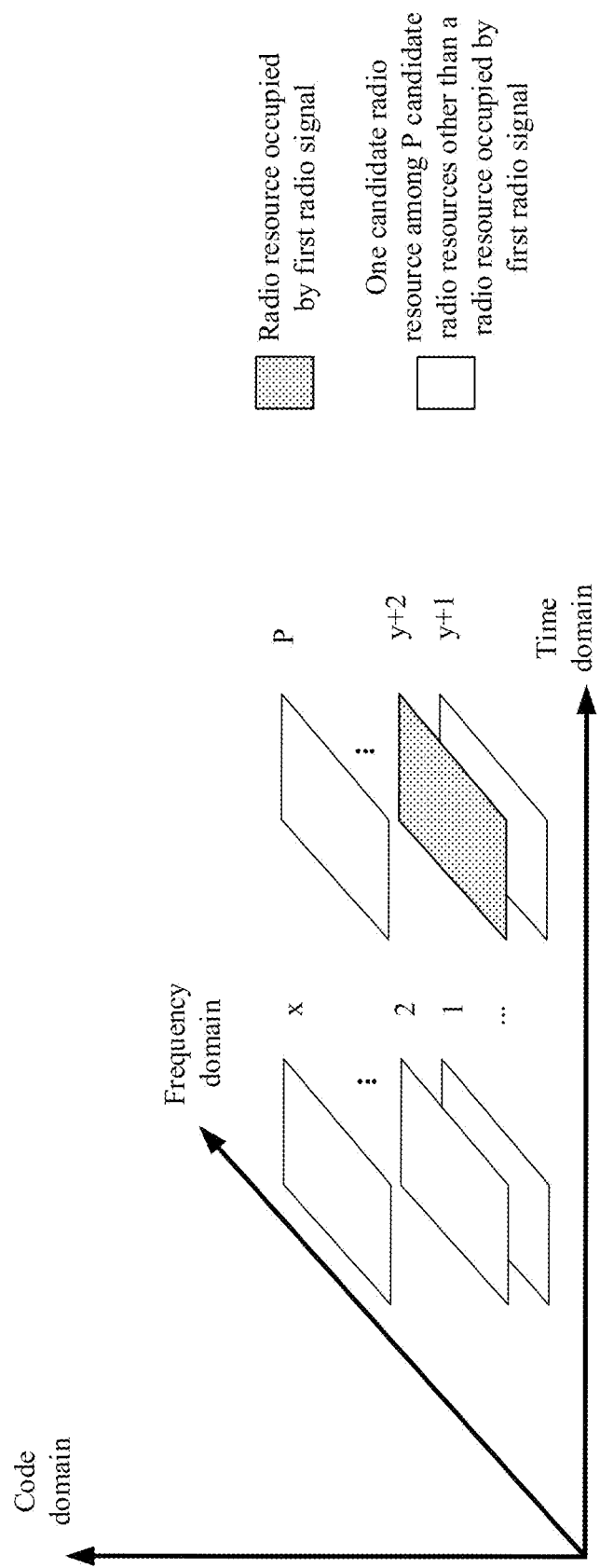
FIG. 10 illustrates a schematic diagram of P candidate radio resources according to one embodiment of the present disclosure.

Embodiment 10 illustrates a schematic diagram of P candidate radio resources according to one embodiment of the present disclosure, as shown in FIG. 10. In FIG. 10, the horizontal axis represents time domain, the longitudinal axis represents frequency domain, and the vertical axis represents code domain; the dot-filled rectangle represents a radio resource occupied by the first radio signal, and each blank rectangle represents a candidate radio resource among P candidate radio resources other than a radio resource occupied by the first radio signal.

In Embodiment 10, the third information in the present disclosure is used for indicating P candidate radio resources, and a radio resource occupied by the first radio signal is one of the P candidate radio resources, P being a positive integer, the third information is transmitted via the air interface.

In one embodiment, the first-type communication node randomly selects the radio resource occupied by the first radio signal from the P candidate radio resources.

In one embodiment, any of the P candidate radio resources comprises at least one of a time-domain resource, a frequency-domain resource or a code-domain resource.

In one embodiment, the phrase that a radio resource occupied by the first radio signal is used for determining at least one of a frequency-domain resource occupied by the second radio signal, a code-domain resource occupied by the second radio signal or a Modulation and Coding Scheme employed by the second radio signal in the present disclosure means that a position of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

In one embodiment, the phrase that a radio resource occupied by the first radio signal is used for determining at least one of a frequency-domain resource occupied by the second radio signal, a code-domain resource occupied by the second radio signal or a Modulation and Coding Scheme employed by the second radio signal in the present disclosure means that an ordering index of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

Embodiment 11

Figure 11:
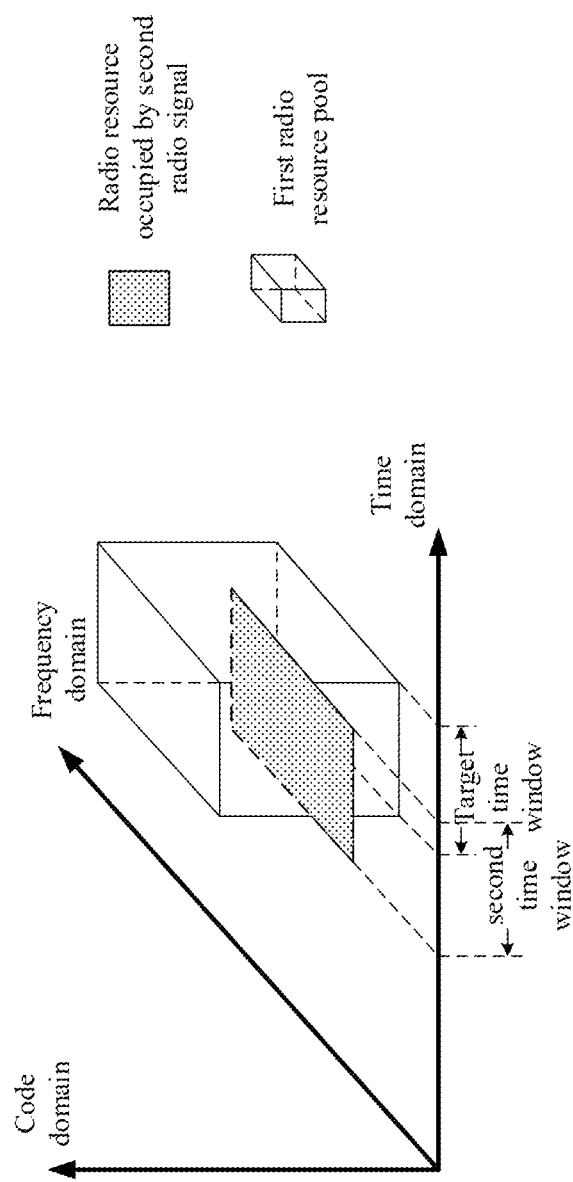
FIG. 11 illustrates a schematic diagram of a first radio resource pool according to one embodiment of the present disclosure.

Embodiment 11 illustrates a schematic diagram of a first radio resource pool according to one embodiment of the present disclosure, as shown in FIG. 11. In FIG. 11, the horizontal axis represents time domain, the longitudinal axis represents frequency domain, and the vertical axis represents code domain; the dot-filled rectangle represents a radio resource occupied by the second radio signal, and the blank cuboid represents a first radio resource pool.

In Embodiment 11, the first information in the present disclosure is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

In one embodiment, the first information is used for directly indicating the first radio resource pool.

In one embodiment, the first information is used for indirectly indicating the first radio resource pool.

In one embodiment, the first information is used for explicitly indicating the first radio resource pool.

In one embodiment, the first information is used for implicitly indicating the first radio resource pool.

In one embodiment, the first radio resource pool occupies contiguous time-domain resources.

In one embodiment, the first radio resource pool occupies discrete time-domain resources.

In one embodiment, the first radio resource pool only comprises one code-domain resource corresponding to a characteristic sequence.

In one embodiment, the first radio resource pool comprises Q candidate radio resources, and a target radio resource is one of the Q candidate radio resources, Q being a positive integer; a frequency-domain resource occupied by the second radio signal is the same as a frequency-domain resource comprised by the target radio resource, a code-domain resource occupied by the second radio signal is the same as a code-domain resource comprised by the target radio resource, and a time-domain resource comprised by the target radio resource is the target time window.

In one embodiment, the first radio resource pool comprises Q candidate radio resources, and a target radio resource is one of the Q candidate radio resources, Q being a positive integer; a frequency-domain resource occupied by the second radio signal is same as a frequency-domain resource comprised by the target radio resource, a code-domain resource occupied by the second radio signal is same as a code-domain resource comprised by the target radio resource, and a time-domain resource comprised by the target radio resource is the target time window; the phrase that the radio resource occupied by the first radio signal is used for determining at least one of the frequency-domain resource occupied by the second radio signal or the code-domain resource occupied by the second radio signal in the first radio resource pool means that the radio resource occupied by the first radio signal is used for determining a target radio resource out of the Q candidate radio resources.

Embodiment 12

Figure 12:
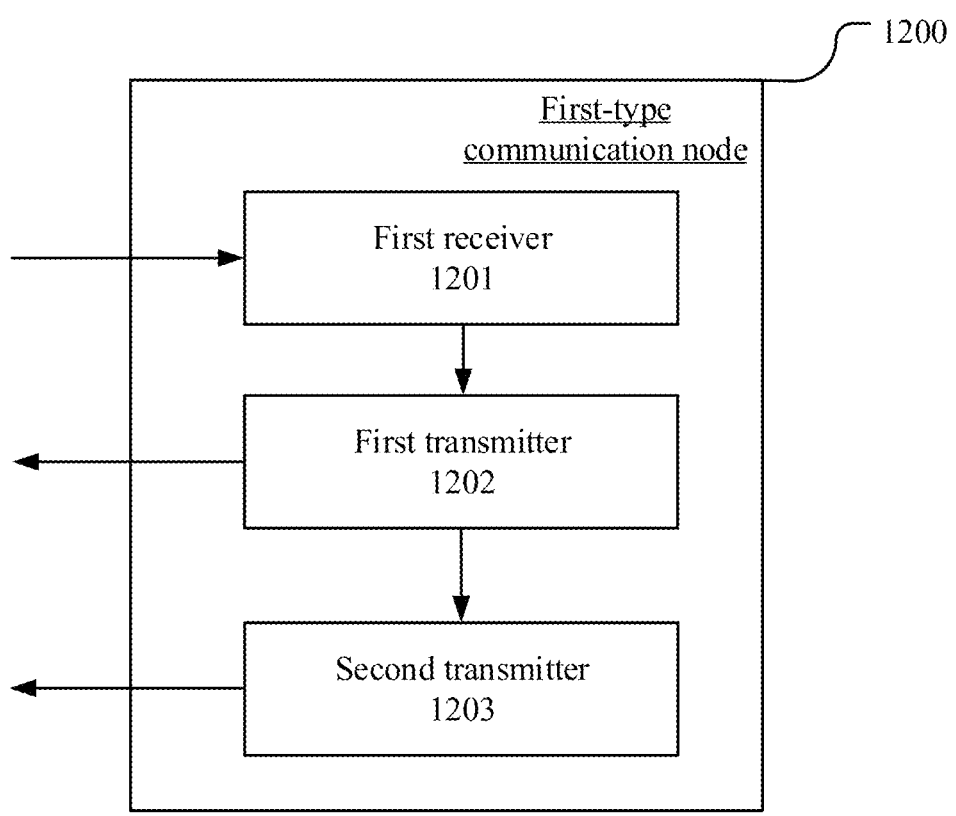
FIG. 12 illustrates a structure block diagram of a processing device in a first-type communication node according to one embodiment of the present disclosure.

Embodiment 12 illustrates a structure block diagram of a processing device in a first-type communication node, as shown in FIG. 12. In FIG. 12, a first-type communication node's processing device 1200 comprises a first receiver 1201, a first transmitter 1202 and a second transmitter 1203. The first receiver 1201 comprises the transmitter/receiver 456 (comprising the antenna 460), the receiving processor 452 and the controller/processor 490 in FIG. 4 of the present disclosure; the first transmitter 1202 comprises the transmitter/receiver 456 (comprising the antenna 456), the transmitting processor 455 and the controller/processor 490 in FIG. 4 of the present disclosure; the second transmitter 1203 comprises the transmitter/receiver 456 (comprising the antenna 460), the transmitting processor 455 and the controller/processor 490 in FIG. 4 of the present disclosure.

In Embodiment 12, the first receiver 1201 receives first information and second information; the first transmitter 1202 transmits a first radio signal in a first time window; the second transmitter 1203 transmits a second radio signal; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the second time window belongs to the target time window, a time length of a time interval between an end of the second time window and an end of the target time window is no less than a difference between a time length of the first time window and a time length occupied by the first radio signal.

In one embodiment, the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

In one embodiment, the first receiver 1201 also receives third information; herein, the third information is used for indicating P candidate radio resources, and a radio resource occupied by the first radio signal is one of the P candidate radio resources, P being a positive integer, the third information is transmitted via the air interface.

In one embodiment, the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

Embodiment 13

Figure 13:
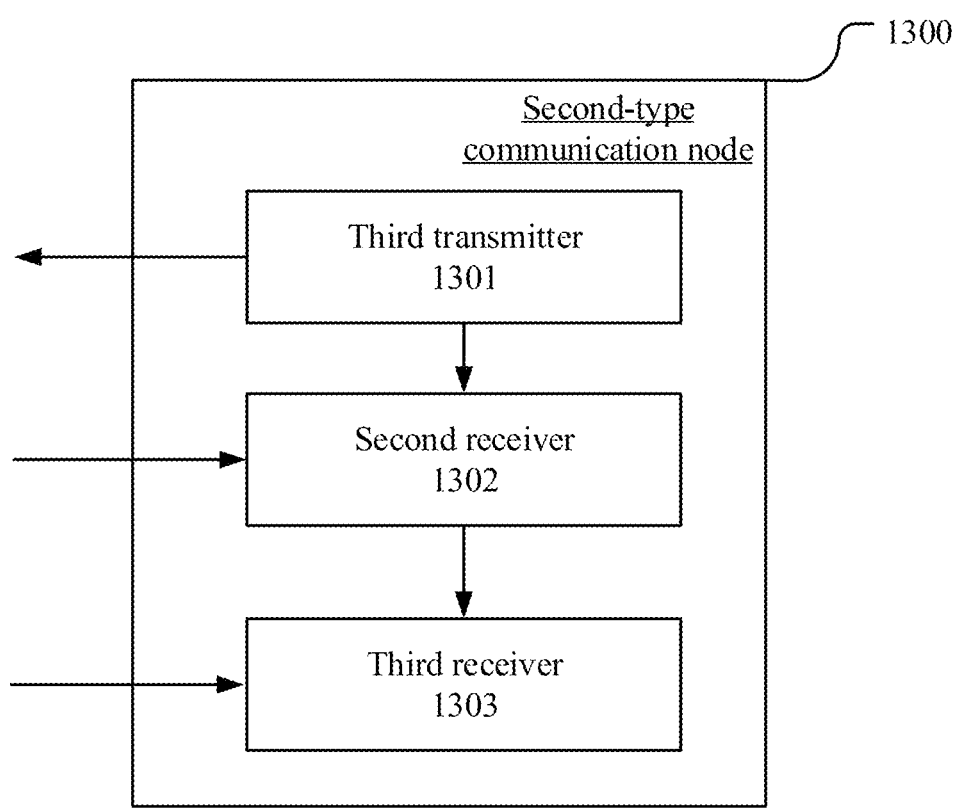
FIG. 13 illustrates a structure block diagram of a processing device in a second-type communication node according to one embodiment of the present disclosure.

Embodiment 13 illustrates a structure block diagram of a processing device in a second-type communication node, as shown in FIG. 13. In FIG. 13, a second-type communication node's processing device 1300 comprises a third transmitter 1301, a second receiver 1302 and a third receiver 1303. The third transmitter 1301 comprises the transmitter/receiver 416 (comprising the antenna 420), the transmitting processor 415 and the controller/processor 440 in FIG. 4 of the present disclosure; the second receiver 1302 comprises the transmitter/receiver 416 (comprising the antenna 420), the receiving processor 412 and the controller/processor 440 in FIG. 4 of the present disclosure; the third receiver 1303 comprises the transmitter/receiver 416 (comprising the antenna 420), the receiving processor 412 and the controller/processor 440 in FIG. 4 of the present disclosure.

In Embodiment 13, the third transmitter 1301 transmits first information and second information; the second receiver 1302 monitors a first radio signal in a first time window; if the first radio signal is detected, the third receiver 1303 receives a second radio signal; herein, the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface.

In one embodiment, the second time window belongs to the target time window, a time length of a time interval between an end of the second time window and an end of the target time window is no less than a difference between a time length of the first time window and a time length occupied by the first radio signal.

In one embodiment, the second time window comprises a time-domain resource outside the target time window, a time length of a time interval between an end time for a transmission of the first radio signal and an end of the first time window is a first gap length, and a time length of a time interval between a start of the first time window and a start time for a transmission of the first radio signal is a second gap length; a time length of a time interval between a start of the second time window and a start of the target time window is equal to the first gap length, or a time length of a time interval between an end of the target time window and an end of the second time window is equal to the second gap length.

In one embodiment, the third transmitter 1301 also transmits third information; herein, the third information is used for indicating P candidate radio resources, and a radio resource occupied by the first radio signal is one of the P candidate radio resources, P being a positive integer, the third information is transmitted via the air interface.

In one embodiment, the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second-type communication node or base station or network-side equipment in the present disclosure includes but is not limited to macro-cellular base stations, micro-cellular base stations, home base stations, relay base station, eNB, gNB, Transmitter Receiver Point (TRP), relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node used for wireless communications, comprising:
   receiving first information and second information;
   transmitting a first radio signal in a first time window; and
   transmitting a second radio signal;
   wherein the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface; the first information and the second information are transmitted as two different fields in a same signaling, the first information is used for indicating at least one of a time length of a time interval between a start of the target time window and a start of the first time window, or a time length of the target time window; the first radio signal is transmitted through a physical random access channel, the second radio signal is transmitted through a physical uplink shared channel; a radio resource occupied by the first radio signal comprises a characteristic sequence resource for generating the first radio signal and a time-frequency resource for transmitting the first radio signal.

2. The method according to claim 1, wherein the second time window belongs to the target time window, a time length of a time interval between an end of the second time window and an end of the target time window is no less than a difference between a time length of the first time window and a time length occupied by the first radio signal.

3. The method according to claim 1, wherein a timing for the target time window is relevant to a timing for the first time window, and a time interval from the end of the first time window to the start of the target time window is no less than X millisecond(s), X being positive which is pre-defined or configurable.

4. The method according to claim 1, further comprising:
   receiving third information;
   wherein the third information is used for indicating P candidate radio resources, and a radio resource occupied by the first radio signal is one of the P candidate radio resources, P being a positive integer, the third information is transmitted via the air interface; the first information and the third information are transmitted as different information elements in a same RRC signaling; the first-type communication node randomly selects the radio resource occupied by the first radio signal from the P candidate radio resources; an ordering index of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

5. The method according to claim 1, wherein the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

6. A method in a second-type communication node used for wireless communications, comprising:
transmitting first information and second information;
monitoring a first radio signal in a first time window; and
receiving a second radio signal when the first radio signal is detected;
wherein the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface; the first information and the second information are transmitted as two different fields in a same signaling, the first information is used for indicating at least one of a time length of a time interval between a start of the target time window and a start of the first time window, or a time length of the target time window; the first radio signal is transmitted through a physical random access channel, the second radio signal is transmitted through a physical uplink shared channel; a radio resource occupied by the first radio signal comprises a characteristic sequence resource for generating the first radio signal and a time-frequency resource for transmitting the first radio signal.

7. The method according to claim 6, wherein the second time window belongs to the target time window, a time length of a time interval between an end of the second time window and an end of the target time window is no less than a difference between a time length of the first time window and a time length occupied by the first radio signal.

8. The method according to claim 6, wherein a timing for the target time window is relevant to a timing for the first time window, and a time interval from the end of the first time window to the start of the target time window is no less than X millisecond(s), X being positive which is pre-defined or configurable.

9. The method according to claim 6, further comprising:
transmitting third information;
wherein the third information is used for indicating P candidate radio resources, and a radio resource occupied by the first radio signal is one of the P candidate radio resources, P being a positive integer, the third information is transmitted via the air interface; the first information and the third information are transmitted as different information elements in a same RRC signaling; the first-type communication node randomly selects the radio resource occupied by the first radio signal from the P candidate radio resources; an ordering index of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

10. The method according to claim 6, wherein the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

11. A first-type communication node used for wireless communications, comprising:
a first receiver, receiving first information and second information;
a first transmitter, transmitting a first radio signal in a first time window; and
a second transmitter, transmitting a second radio signal;
wherein the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface; the first information and the second information are transmitted as two different fields in a same signaling, the first information is used for indicating at least one of a time length of a time interval between a start of the target time window and a start of the first time window, or a time length of the target time window; the first radio signal is transmitted through a physical random access channel, the second radio signal is transmitted through a physical uplink shared channel; a radio resource occupied by the first radio signal comprises a characteristic sequence resource for generating the first radio signal and a time-frequency resource for transmitting the first radio signal.

12. The first-type communication node according to claim 11, wherein the second time window belongs to the target time window, a time length of a time interval between an end of the second time window and an end of the target time window is no less than a difference between a time length of the first time window and a time length occupied by the first radio signal.

13. The first-type communication node according to claim 11, wherein a timing for the target time window is relevant to a timing for the first time window, and a time interval from the end of the first time window to the start of the target time window is no less than X millisecond(s), X being positive which is pre-defined or configurable.

14. The first-type communication node according to claim 11, wherein the first receiver receives third information; wherein the third information is used for indicating P candidate radio resources, and a radio resource occupied by the first radio signal is one of the P candidate radio resources, P being a positive integer, the third information is transmitted via the air interface; the first information and the third information are transmitted as different information elements in a same RRC signaling; the first-type communication node randomly selects the radio resource occupied by the first radio signal from the P candidate radio resources; an ordering index of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

15. The first-type communication node according to claim 11, wherein the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

16. A second-type communication node used for wireless communications, comprising:
a third transmitter, transmitting first information and second information;
a second receiver, monitoring a first radio signal in a first time window; and
a third receiver, receiving a second radio signal when the first radio signal is detected;
wherein the first information is used for determining a target time window, the second radio signal occupies a second time window in time domain, and the second information is used for determining at least one of whether the second time window belongs to the target time window or a relative position relationship between the second time window and the target time window; an end of the first time window is earlier than a start of the target time window, a radio resource occupied by the first radio signal is used for determining at least one of a frequency-domain resource occupied by the second radio signal, a code-domain resource occupied by the second radio signal or a Modulation and Coding Scheme employed by the second radio signal; the first information, the second information, the first radio signal and the second radio signal are all transmitted via an air interface; the first information and the second information are transmitted as two different fields in a same signaling, the first information is used for indicating at least one of a time length of a time interval between a start of the target time window and a start of the first time window, or a time length of the target time window; the first radio signal is transmitted through a physical random access channel, the second radio signal is transmitted through a physical uplink shared channel; a radio resource occupied by the first radio signal comprises a characteristic sequence resource for generating the first radio signal and a time-frequency resource for transmitting the first radio signal.

17. The second-type communication node according to claim 16, wherein the second time window belongs to the target time window, a time length of a time interval between an end of the second time window and an end of the target time window is no less than a difference between a time length of the first time window and a time length occupied by the first radio signal.

18. The second-type communication node according to claim 16, wherein a timing for the target time window is relevant to a timing for the first time window, and a time interval from the end of the first time window to the start of the target time window is no less than X millisecond(s), X being positive which is pre-defined or configurable.

19. The second-type communication node according to claim 16, wherein the third transmitter transmits third information; wherein the third information is used for indicating P candidate radio resources, and a radio resource occupied by the first radio signal is one of the P candidate radio resources, P being a positive integer, the third information is transmitted via the air interface; the first information and the third information are transmitted as different information elements in a same RRC signaling; the first-type communication node randomly selects the radio resource occupied by the first radio signal from the P candidate radio resources; an ordering index of the radio resource occupied by the first radio signal among the P candidate radio resources is used for determining at least one of a frequency-domain resource occupied by the second radio signal, a code-domain resource occupied by the second radio signal or a Modulation and Coding Scheme employed by the second radio signal.

20. The second-type communication node according to claim 16, wherein the first information is used for indicating a first radio resource pool, frequency-domain resources comprised by the first radio resource pool comprise the frequency-domain resource occupied by the second radio signal, code-domain resources comprised by the first radio resource pool comprise the code-domain resource occupied by the second radio signal, and time-domain resources comprised by the first radio resource pool comprise the target time window, the radio resource occupied by the first radio signal is used for determining at least one of the frequency-domain resource occupied by the second radio signal or the code-domain resource occupied by the second radio signal in the first radio resource pool.

* * * * *